Oct. 13, 1970     M. J. FORSTER ET AL     3,533,282
METHOD AND APPARATUS FOR TESTING TIRE
CORDS IMBEDDED IN RUBBER PADS
Filed Oct. 30, 1967
FIG. 1
STATIC-UNLOADED
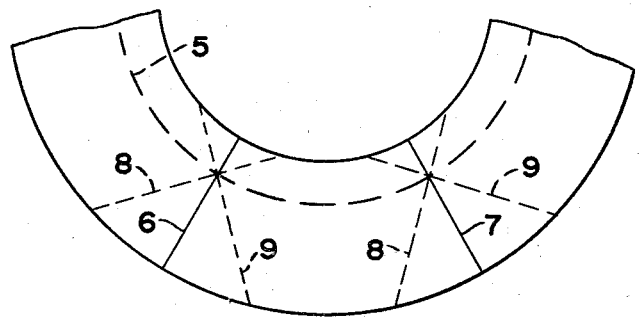
FIG. 2
60 M.P.H.
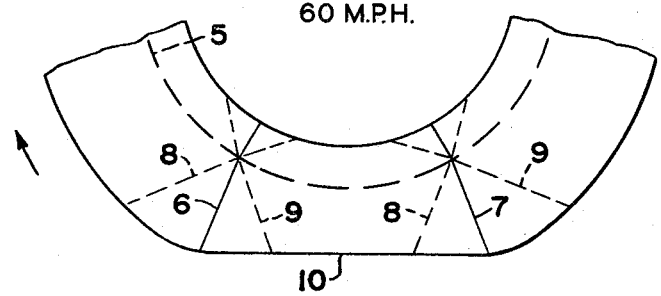
FIG. 3     FIG. 4     FIG. 5
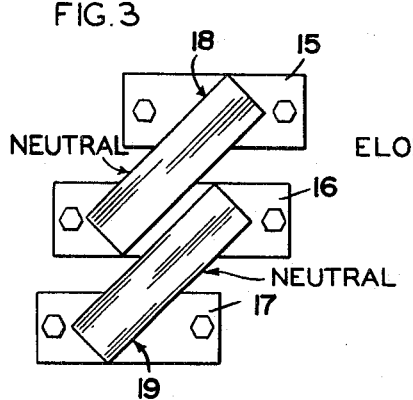 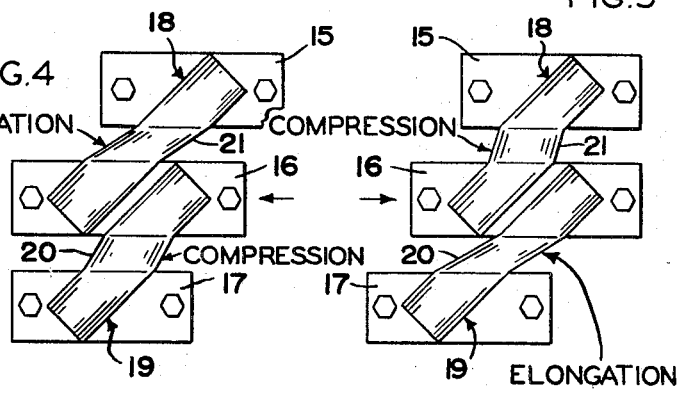
FIG. 6
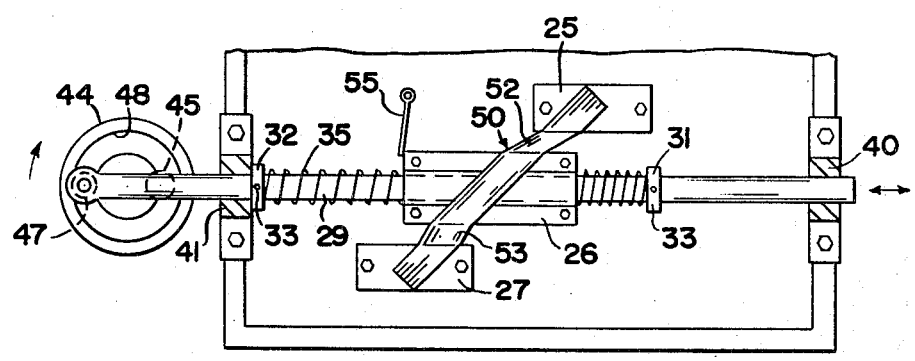

United States Patent Office
3,533,282
Patented Oct. 13, 1970

3,533,282
METHOD AND APPARATUS FOR TESTING TIRE CORDS IMBEDDED IN RUBBER PADS
Michael J. Forster and Irven B. Prettyman, Akron, Ohio, assignors to The Firestone Tire & Rubber Company, Akron, Ohio, a corporation of Ohio
Filed Oct. 30, 1967, Ser. No. 679,033
Int. Cl. G01n *3/32*
U.S. Cl. 73—91        6 Claims

ABSTRACT OF THE DISCLOSURE

A new process of testing tirecord and tire fabric has been developed, as well as apparatus for carrying out the test. There are two forms of apparatus, and they are designed to measure flex fatique by subjecting the cord or fabric to shear compression and elongation. The test may be run under conditions of fixed stress amplitude or fixed strain amplitude, or both, and the amplitude may be varied. Both types of equipment involve cured-in-rubber test cord areas which are tested simultaneously. The preferred type of equipment tests two different portions of the same specimen simultaneously, and the other type of equipment tests two different specimens. During the run the ends of the tested portions or samples are clamped between parallel members so as to expose rhombic or rhomboidal areas of the specimens, and alternating back and forth movement of the clamps subjects the test areas or portions to shear, elongating the cords in one specimen while simultaneously subjecting the cords in the other specimen to compression, and then reverses the treatments.

---

The invention relates to a new method and apparatus for testing tirecord and tire fabric. When employed to test tirecord, one or more specimens of the cord are embedded in rubber.

Essentially, the method is a method of measuring flex-fatigue resistance by subjecting the cords to a combination of shear compression and elongation. By developing compression and elongation by shear movement in the test specimen, fatigue is developed under conditions more comparable to those to which the cord or fabric is subjected in a tire in use than by test methods commonly employed.

Various methods and apparatus for examining fatigue in tirecord and tire fabric have been developed. Some of these use test samples which require much experience and time for construction, and errors in the constructions of the samples produce errors in the results obtained. Others employ quite simple equipment. Different apparatus and methods have been employed for testing compression and elongation but not by subjecting the samples to shear.

By actual tests on tires it has been found that at the top of the turned-up ply there is a shearing action which produces an alternating tension and compression cycle in the sidewall of a tire when the tire is being used. The method and apparatus of this invention are designed primarily to simulate or duplicate this fatiguing action in a bias-ply tire.

It is customary to make tests in duplicate, and one type or apparatus developed subjects two different specimens of the same sample to testing simultaneously, and this will be referred to herein as the two-specimen tester. The other apparatus and method employ a single-test specimen and subject different portions to the shear elongation and compression action at the same time, and this, which is the preferred apparatus, will be referred to herein as the single-specimen tester. In both types of apparatus and process, rhombic or rhomboidal portions of the specimens are subjected to alternating compression and elongation through shear. The two-specimen machine can be operated to subject the test portions to controlled stress or controlled strain. The one-specimen tester can be operated under maximum strain but is preferably operated under conditions approaching constant maximum stress.

In the test, the cords are subjected to shear compression and elongation. The failed cords in a test pad resemble the failed cords removed from tires, and this indicates that the conditions are simulated which produce fatigue in the use of a tire.

Advantages of the test of the invention are:

(1) By subjecting the cords to shear compression and elongation, the apparatus produces a flexing action in the cords which closely resembles that which takes place in the cords of a tire as revealed in a high speed moving picture of a tire subjected to severe conditions often encountered in service.
(2) The shear strain, and therefore the compression and elongation, is controlled by the cord modulus in the fixed stress-testing. Thus, the cord itself limits the amplitude of the flexing as it does in a tire.
(3) The flexing conditions may be varied to control the rate of failure of the cords and to approximate constructions of the tire. Variables are:
    (a) Temperature.
    (b) Maximum stress amplitude (in controlled stress testing).
    (c) Maximum strain amplitude (in controlled strain testing).
    (d) Angle between cord and shearing direction.

The invention will be further described in connection with the accompanying drawings, in which—

FIG. 1 illustrates a portion of an inflated unloaded tire marked to show that the only strain in the cords or fabric in the unloaded tire is due to inflation;

FIG. 2 illustrates the same section under load and rotating in the direction of the arrow, and shows the additional change in strain in the cords resulting from the load in the footprint area;

FIGS. 3, 4, and 5 are diagrammatic but illustrate the functioning of the two-specimen tester and its effect on the specimens; and FIG. 6 shows diagrammatically the functioning of the one-specimen tester.

It is noted that in each of FIGS. 3 to 6 the test areas of the specimens are inversely congruent to one another so that one is subjected to compression while the other is elongated.

FIG. 1 illustrates a portion of a two-ply, bias-ply tire in static condition when not under any load. The tire is of the usual type in which the ends of the plies have been turned up over the bead and the dotted-line curve 5 illustrates the top of the turned-up portion. It is known that fatigue usually occurs along this line and if there are several plies the greatest fatigue is usually developed at the top of the highest turn-up. Therefore, it is this highest turn-up that is illustrated by the dotted line 5 if there are several plies in the tire. For test purposes radial lines 6 and 7 were marked on the surface of the tire with a pencil. It is known that the cords in the carcass of a bias-ply tire cross one another, and lines 8 and 9 illustrate the position of cords in two adjacent plies of the tire which cross at the juncture of the lines 6 and 7, respectively, at the dotted line 5.

FIG. 2 is an illustration of the same tire under load and rotating in the direction of the arrow. The flattened surface 10 of the tread of the tire is known as the "footprint" and is the constantly changing surface which contacts the pavement or other support for the tire. Surprisingly, it was found that under load the pencil lines 6 and 7 adjacent opposite edges of the footprint angle sharply at the top 5 of the turn-up. It will be noted that line 9 at the right side of FIG. 2 illustrating the position of one of the cords in the carcass is angled where it crosses the line 5 and is elongated, and the line 8 which represents a cord in the other ply is foreshortened. At the left side of FIG. 2 it is the cord in the position of the line 9 which is foreshortened and the cord in the position of the line 8 which is elongated.

Understanding that this is the play of forces which fatigues cords in a tire, the apparatus of this invention has been designed to duplicate such action as closely as possible and, as is usual in equipment for laboratory testing, the machines are designed to accelerate this fatiguing action.

The two-speciment tester illustrated schematically in FIGS. 3, 4, and 5 is a very simple type of equipment for developing under shear the compression and elongation in tire cords and fabrics which produce flex fatigue. In each of these figures, it is to be understood that the ends of the specimens are clamped between two plates each illustrated by a single rectangle, 15, 16 and 17, respectively, the two specimens being designated 18 and 19. The supporting apparatus and mechanism for oscillating the middle panel have been omitted to most clearly show the action on the specimens. Each specimen contains cords 20 cured in rubber, or each specimen is a sample of cord fabric composed of cords 20 cured in rubber. The cords are parallel to the edges of the specimens which are exposed between the clamps. A typical construction would use a test specimen of a width of ⅞ inch and length of 3 inches with a gap of ³⁄₁₆ inch between the clamps (this distance being exaggerated in the drawing to facilitate illustration). These distances are arbitrary and can be altered as desired. In order to maintain the specimens of standard width the clamp surfaces are advantageously provided with depressed areas of the exact size to receive the ends of the samples, but other means for preventing widening of the samples when clamped, may be employed, such as by using square-woven fabric cured into the rubber over the clamping areas.

The edges of the clamped areas are parallel to one another, exposing test portions of the specimens which may be either rhombic or rhomboidal. Using rectangular test portions the shear would not produce compression, but only elongation.

The clamps 15 and 17 are preferably held stationary and the clamp 16 is oscillated as indicated by the arrows in FIGS. 4 and 5 to produce the desired shear. Other means of producing shear may be employed such as by oscillating the clamps 15 and 17 simultaneously and holding the clamp 16 stationary.

Three clamps are used in order to test two test areas simultaneously. In FIG. 3 the clamps are arranged so that no compression or elongation is applied to the specimens, the clamp 16 being in the neutral position. In FIGS. 4 and 5 the clamp 16 is shown as moved first in one direction and then in the other direction, placing the cords of a specific area alternately in elongation and compression, as indicated in the figures.

The test action is characterized by the fact that in FIG. 4, when the portion 20 is being compressed, the compressive action is repressed by the simultaneous elongation of portion 21. As the clamp 16 is moved in the opposite direction (FIG. 5), the elongation of portion 20 represses the compression of portion 21.

The strain or stress amplitude can be controlled by mechanisms such as that used and described in Prettyman et al. U.S. 2,713,260. To get constant strain, the travel of the clamp 16 will be set at a fixed maximum displacement. Alternatively, by the use of a signal of a load cell, which would automatically adjust the maximum displacement of the clamp 16, the sample will be repeatedly subjected to constant maximum stress.

FIG. 6 illustrates the preferred one-specimen tester which can be used for subjecting different portions of a single specimen to fatigue testing. The apparatus shown can be duplicated in series so that any number of specimens can be tested simultaneously. The ends of the specimen are clamped between pairs of parallel clamps 25, 26 and 27. Clamps 25 and 27 are stationary. Clamp 26 is movably mounted on the shaft 29. The ends of the shaft are movably supported. Collars 31 and 32, fastened to the shaft by setscrews 33, hold springs 34 and 35 within bounds on the shaft 29. One end of the shaft is supported in the bearing 40 and the other end passes through the bearing 41 and is fastened to the eccentric 44 which rotates about the center 45. A follower 47 in the end of the shaft moves in the groove 48 as the eccentric is rotated. It is understood that other means of producing this displacement of the shaft 29 may be employed.

The ends of specimen 50 are held in the clamps 25 and 27 and a central portion is held in the clamp 26, thus providing two rhombic or rhomboidal portions 52 and 53 which are simultaneously subjected to the same shear elongation and compression through the motion of the central clamp 26. This clamp is moved back and forth by the back-and-forth motion of the shaft which is translated to the clamp through the springs 34 and 35. Because of the springs, the large constant amplitude of the shaft is translated into a relatively small amplitude of the clamp 26 operating at almost constant stress.

Two parallel clamps can be used, moving relatively to one another, if two samples are attached to the clamps inversely congruent to one another. Thus, two oppositely positioned rhombic or rhomboidal samples would be provided. One would be subjected to compression while the other is elongated, and the reverse would occur when the relative position of the clamps is interchanged.

Thus, the shear compression and elongation to which a sample is subjected in the laboratory test are similar to strain to which the cords in a tire are subjected. The sample can be subjected to this shearing motion for a given length of time and the sample removed and tested for loss of strength of an Instron or other tensile tester, or the sample can be flexed until ultimate failure occurs, in which case the trigger 55 is activated and the timer or counter is automatically turned off to indicate the completion of the test. It is understood that various variables can be provided in the equipment. The specimens shown form a 45° angle with the clamps; however, it is understood that this angle can be changed if desired and still maintain the element of compression, so long as the specimens are not perpendicular to the clamps. The test can be applied to samples which are fastened perpendicularly to the clamps. This would simulate the geometry of cords in a radial ply tire. In this case, both samples would be elongated together, and they would never be compressed. In the drawing the clamp 26 is at the left end of the structure so that the cords in the portion 52 of the specimen are under elongation and the cords 53 below the clamp 56 are under compression. The distance between the clamps again is exaggerated to facilitate illustration. The amplitude of the oscillation of the shaft may be varied by the use of any suitable eccentric, and for purposes of illustration it may be about an inch, in which case the amplitude of the oscillation of the clamp may be only two-tenths to three-tenths of an inch, the motion being restrained by the test specimens.

Referring to FIG. 2, the elongation and compression of the cords is illustrated, and as the tire rotates the same cords are first compressed and then elongated, and the resulting fatigue is closely duplicated by the elongation and compression of portions of the test samples due to the movement of the clamp. The compression and elongation are developed through shear and this simulates or duplicates the shear acting on the cords of a tire as illustrated by the displacement of the pencil lines as illustrated in FIG. 2.

The invention is further illustrated by the following examples:

EXAMPLE 1

This illustrates how the test apparatus of this invention may be used to compare different cord constructions. The results correlate well with the results obtained in the test described in the Journal of the Society of Automotive Engineers for June 1, 1965, as SAE–J–918, and adopted by the Federal Government Vehicle Safety Committee. This test is known as the VESC Step Load Endurance Test and tests tires, not cords.

Tire cords used in two-ply tires were prepared from 1260 denier synthetic yarn, in a series of twists. The cord was woven into 30 ends per inch fabric, treated and evaluated for fatigue on the test to determine the strength retained after flexing one hour at 160° F. (71.11° C.) with 15 pounds fixed stress amplitude. The same cord fabric in 7.75 x 14 two-ply tires was subjected to the VESC test, which is operated successively for four hours at 1120 pounds, six hours at 1345 pounds and then twenty-four hours at 1570 pounds at 50 miles per hour. The results obtained in the different tests, with different tirecord twists per inch (t.p.i.) are recorded in the following table.

|  | Fatigue resistance | |
| --- | --- | --- |
|  | Invention | VESC |
| Tirecord twist (t.p.i.): | | |
| 8.5 x 8.9 | 82 | 67 |
| 10.0 x 10.4 | 100 | 100 |
| 11.5 x 11.9 | 94 | 87 |
| 13.0 x 13.4 | 106 | 88 |

The 10.0 x 10.4 twist per inch is usually preferred for tirecords because these cords have optimum strength consistent with good flex resistance. (The 10.0 x 10.4 twist means 10 turns per inch in each yarn ply in Z direction, and two plies twisted to 10.4 turns per inch in S direction to form a cabled cord, and the other twists are similarly coded.) The test results show that there is no real advantage in using a higher twist which would entail a sacrifice of strength.

EXAMPLE 2

The twist series of Example 1 was evaluated for fatigue on the test of this invention by determining the strength retained after flexing 7 hours at 0.1 inch fixed strain amplitude at various temperatures. The following ratings relative to the 10 x 10.4 twist per inch at 160° F. were obtained:

|  | Relative Fatigue Resistance | | |
| --- | --- | --- | --- |
|  | 75° F. | 160° F. | 270° F. |
| Tire cord Twist (t.p.i.): | | | |
| 8.5 x 8.9 | 156 | 67 | 24 |
| 10.0 x 10.4 | 475 | 100 | 37 |
| 11.5 x 11.9 | 152 | 55 |  |
| 13.0 x 13.4 | 138 | 55 |  |

The results show that flex resistance decreases with increasing temperature for all of the twists.

EXAMPLE 3

A comparison was made of the strength retained after flexing for one hour at 160° F. at both 15-pound fixed stress amplitude and 0.1 inch fixed strain amplitude, of a series of styles of tirecords of different deniers and different numbers of ply constructions, as indicated. The following ratings relative to Polyester A were obtained:

| Style | Construction | Twist | Relative Fatigue Resistance amplitudes | |
| --- | --- | --- | --- | --- |
|  |  |  | Fixed Stress | Fixed Strain |
| Rayon | 2,200/3 | 8.6 x 9.1 | 91 | 86 |
| Nylon 6 | 1,260/2 | 10 x 10.4 | 89 | 94 |
| Polyester A | 1,000/3 | 10 x 10 | 100 | 100 |
| Polyester B | 1,000/3 | 10 x 10 | 90 | 92 |

These data show behavior of the different styles not to be radically different. This is as it should be since it is known that excellent tires from the fatigue standpoint can be made from all of the styles listed. The rayon-nylon 6 comparison illustrates that the relative ratings depend upon whether the test is run at constant maximum stress or strain. Instead of stopping the test at the end of one hour or any other given time, the test might be run to cord rupture.

EXAMPLE 4

This illustrates the flexing of specimens of different cord materials to failure, flexing at both fixed strain amplitude and fixed stress amplitude.

The table defines the types of cord tested, and the times of failure in the different tests.

|  | Construction | Twist (t.p.i.) | Time (min.) to Failure | |
| --- | --- | --- | --- | --- |
|  |  |  | Strain[1] | Stress[2] |
| Style: | | | | |
| Polyester | 1,000/3 | 10 x 10 | 208 | 203 |
| Nylon 6 | 1,160/3 | 8.4 x 8.4 | 420 | 143 |
| Rayon | 2,200/3 | 8.6 x 9.1 | 83 | 203 |

[1] At 0.25 inch fixed strain amplitude.
[2] At 30 lb. fixed stress amplitude.

We claim:

1. Apparatus for testing specimens of tire cords in rubber pads reinforced with said tire cords arranged parallel to one another therein, which apparatus comprises first and second clamp means adapted to hold opposite edges of congruent rhombic or rhomboidal areas of said pads of the same material in a plane, means for maintaining said first and second clamp means parallel throughout the test, means for holding the first clamp means at one edge of each of said areas stationary and means for reciprocating the second clamp means at the other edge of each area in a straight line with spring means at each end of said second clamp means for translating the motion of said reciprocating means to said clamp means, so that the shear strain imposed on the cords is controlled by the cord modulus, the first clamp means being adapted to clamp the specimens with the cords in the areas at an angle of 45 degrees to the reciprocating clamp so that regardless of the direction of its movement the cords in one of said areas are placed under elongation when the cords in the other of said areas are placed under shear compression of the same strain amplitude.

2. The apparatus of claim 1 in which said first clamp means is adapted to clamp two separate areas of the same specimen.

3. The apparatus of claim 2 which includes switch means adapted to be actuated by said second clamp means when its stroke is elongated due to failure of the test cords.

4. The method of testing parallel tire cords embedded in congruent rhombic or rhomboidal areas of rubber pads comprising the steps of clamping first and second opposite sides of two areas of said pads of the same composition along lines which make an angle of 45 degrees to the cords therein, reciprocally moving said first sides relative to said second sides in a direction parallel to said sides, and resiliently retarding the extent of said movement by an amount dependent on the modulus of elasticity of said cords thereby, simultaneously subjecting the cords in one of said areas to elongation while subjecting the cords in the other of said areas to compression of the same strain amplitude.

5. The method of claim 4 in which the relative movement of said sides is produced in a machine provided with three clamp means consisting of two outside clamps and a middle clamp means by reciprocating the middle clamp means.

6. The method of claim 5, in which the test is completed when cords are broken and the stroke of the reciprocating clamp means is thereby elongated and operates a switch which stops the machine.

References Cited
UNITED STATES PATENTS

| | | | |
|---|---|---|---|
| 1,409,842 | 3/1922 | Foster | 73—100 |
| 1,485,835 | 3/1924 | Bothezat | 73—91 |
| 2,235,622 | 3/1941 | Ray | 73—100 |
| 2,448,133 | 8/1948 | Yorgiadis | 73—100 |
| 2,469,346 | 5/1949 | Watter | 73—100 |
| 2,709,915 | 6/1955 | Conti | 73—91 |
| 3,427,873 | 2/1969 | Mehdizadeh | 73—91 |

FOREIGN PATENTS 196,396  6/1968  Switzerland.

RICHARD C. QUEISSER, Primary Examiner

J. WHALEN, Assistant Examiner

U.S. Cl. X.R.

73—67.3, 100, 159

UNITED STATES PATENT OFFICE
CERTIFICATE OF CORRECTION

Patent No. 3,533,282          Dated October 13, 1970

Inventor(s) Michael J. Forster and Irven B. Prettyman

It is certified that error appears in the above-identified patent and that said Letters Patent are hereby corrected as shown below:

Col. 1, line 65, "or" should read --of--

Col. 3, line 18, "speciment" should read --specimen--

Col. 6, line 39, "1,160/3" should read --1,260/3--

Signed and sealed this 25th day of January 1972.

(SEAL)
Attest:

EDWARD M. FLETCHER, JR.
Attesting Officer

ROBERT GOTTSCHALK
Commissioner of Patents